United States Patent
Ollgaard et al.

(10) Patent No.: US 9,683,556 B2
(45) Date of Patent: Jun. 20, 2017

(54) METHOD OF DAMPING WIND TURBINE TOWER OSCILLATIONS

(71) Applicant: Vestas Wind Systems A/S, Aarhus N. (DK)

(72) Inventors: Borge Ollgaard, Esbjerg (DK); Soren P. Jensen, Varde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/032,918

(22) PCT Filed: Oct. 20, 2014

(86) PCT No.: PCT/DK2014/050340
§ 371 (c)(1),
(2) Date: Apr. 28, 2016

(87) PCT Pub. No.: WO2015/062608
PCT Pub. Date: May 7, 2015

(65) Prior Publication Data
US 2016/0252079 A1    Sep. 1, 2016

(30) Foreign Application Priority Data
Oct. 28, 2013  (DK) ................................ 2013 70627

(51) Int. Cl.
*E04B 1/98* (2006.01)
*F03D 7/02* (2006.01)
(Continued)

(52) U.S. Cl.
CPC .............. *F03D 80/88* (2016.05); *E04B 1/985* (2013.01); *F03D 7/0296* (2013.01); *F03D 13/10* (2016.05);
(Continued)

(58) Field of Classification Search
CPC ........ F03D 7/0296; F03D 80/88; F03D 13/10; F16F 7/10; E04B 1/985; F05B 2260/964
See application file for complete search history.

(56) References Cited

U.S. PATENT DOCUMENTS

| | | | |
|---|---|---|---|
| 7,931,438 B2* | 4/2011 | Schellings | F03D 1/00 415/119 |
| 2008/0145222 A1* | 6/2008 | Schellings | F03D 1/00 416/31 |

(Continued)

FOREIGN PATENT DOCUMENTS

| | | |
|---|---|---|
| EP | 1008747 A2 | 6/2000 |
| EP | 2378118 A2 | 10/2011 |

(Continued)

OTHER PUBLICATIONS

European Patent Office, International Search Report and Written Opinion issued in International Application No. PCT/DK2014/050340 dated Jan. 23, 2015.

(Continued)

*Primary Examiner* — Andrew J Triggs
(74) *Attorney, Agent, or Firm* — Wood Herron & Evans LLP

(57) ABSTRACT

A method of damping oscillations in a wind turbine tower comprises connecting a bag of material or liquid to a tower component at a first lateral distance away from a tower wall. The bag is also suspended from the tower component by a first vertical distance. The height of the tower component is known such that the first vertical distance corresponds to a particular height within the tower. The first lateral distance, first vertical distance, and mass of the bag are such that the bag is configured to hit said tower wall during oscillations in said wind turbine tower, in order to damp said oscillations in said wind turbine tower.

30 Claims, 8 Drawing Sheets

(51) Int. Cl.
*F16F 7/10* (2006.01)
*F03D 80/80* (2016.01)
*F03D 80/00* (2016.01)
*F03D 13/10* (2016.01)

(52) U.S. Cl.
CPC ............... *F03D 80/00* (2016.05); *F16F 7/10* (2013.01); *F05B 2230/60* (2013.01); *F05B 2240/912* (2013.01); *F05B 2260/964* (2013.01); *Y02E 10/728* (2013.01); *Y02P 70/523* (2015.11)

(56) References Cited

U.S. PATENT DOCUMENTS

| | | | | |
|---|---|---|---|---|
| 2010/0314883 | A1* | 12/2010 | Ollgaard | F03D 80/00 290/55 |
| 2011/0056151 | A1 | 3/2011 | Marmo et al. | |
| 2012/0063915 | A1* | 3/2012 | Kawabata | F16F 7/10 416/244 R |
| 2012/0267207 | A1 | 10/2012 | Kawabata et al. | |
| 2016/0123303 | A1* | 5/2016 | Ollgaard | F16F 7/10 52/173.1 |
| 2016/0252079 | A1* | 9/2016 | Ollgaard | F03D 80/00 52/745.17 |

FOREIGN PATENT DOCUMENTS

| | | |
|---|---|---|
| KR | 20110077629 A | 7/2011 |
| WO | 2014040598 A1 | 3/2014 |

OTHER PUBLICATIONS

Danish Patent and Trademark Office, Search Report issued in Application No. PA 2013 70627 dated May 23, 2014.

* cited by examiner

METHOD OF DAMPING WIND TURBINE TOWER OSCILLATIONS

TECHNICAL FIELD

The present invention relates to wind turbines, and in particular to methods of damping oscillations in towers of wind turbines.

BACKGROUND

A horizontal-axis wind turbine typically includes a tower, a nacelle supported by the tower, and a rotor mounted to the nacelle. Over time there has been a significant increase in the overall size of these machines and their components. This increase in size presents many challenges, both before and during operation.

For example, wind turbine towers are tall, slender structures typically comprised of cylindrical and/or conical sections. As wind blows across the tower, vortices are shed alternately from opposite sides of the tower. This gives rise to a fluctuating force acting substantially perpendicular to the wind direction. The fluctuating force can lead to large oscillations when the periodic frequency of the vortex shedding is similar to one of the natural frequencies of the tower.

When the nacelle is installed on a tower, vortex shedding from the wind alone (i.e., when the wind turbine is not in operation) is less of a significant concern. The fluctuating forces have a negligible effect because the massive weight of the nacelle changes the dynamic behavior of the overall structure. Prior to supporting the nacelle, however, the tower is more susceptible to oscillations from vortex shedding. As towers increase in size, lower wind speeds can produce vortex shedding in resonance with a natural frequency of the tower. Thus, large oscillations from vortex shedding become more of a concern.

SUMMARY

A method of damping oscillations in a wind turbine tower comprises connecting a bag of material (e.g., sand) or liquid to a tower component at a first lateral distance away from a tower wall. The bag is also suspended from the tower component by a first vertical distance. The height of the tower component is known such that the first vertical distance corresponds to a particular height within the tower. The first lateral distance, first vertical distance, and mass of the bag are such that the bag is configured to hit said tower wall during oscillations in said wind turbine tower, in order to damp said oscillations in said wind turbine tower. Further, in advantageous embodiments, the sandbags are configured to act as a pendulum counteracting a fundamental mode of vibration of the tower.

This method may be used strategically during installation of the wind turbine because of its ease of use. Thus, the invention also provides a method of installing a wind turbine comprising erecting a tower of the wind turbine and installing a damping system in the tower. The damping system is installed in the manner mentioned above. That is, by connecting a bag of material or liquid to a tower component at a first lateral distance from a tower wall and suspending the bag from the tower component by a vertical distance. Again the height of the tower component is known such that the vertical distance corresponds to a particular height within the tower. The method of installation further involves damping oscillations caused by vortices shed from the tower, wherein the first lateral distance, first vertical distance, and mass of the bag are such that the bag is configured to hit said tower wall during oscillations in said wind turbine tower, in order to damp said oscillations in said wind turbine tower. Further, in advantageous embodiments, the sandbags are configured to act as a pendulum that counteracts a fundamental mode of vibration of the tower. Eventually one or more nacelle components are positioned on the tower thereby making the tower less susceptible to oscillations caused by vortex shedding. Before or after this step, the damping system is removed from the tower.

DETAILED DESCRIPTION

Figure 1:
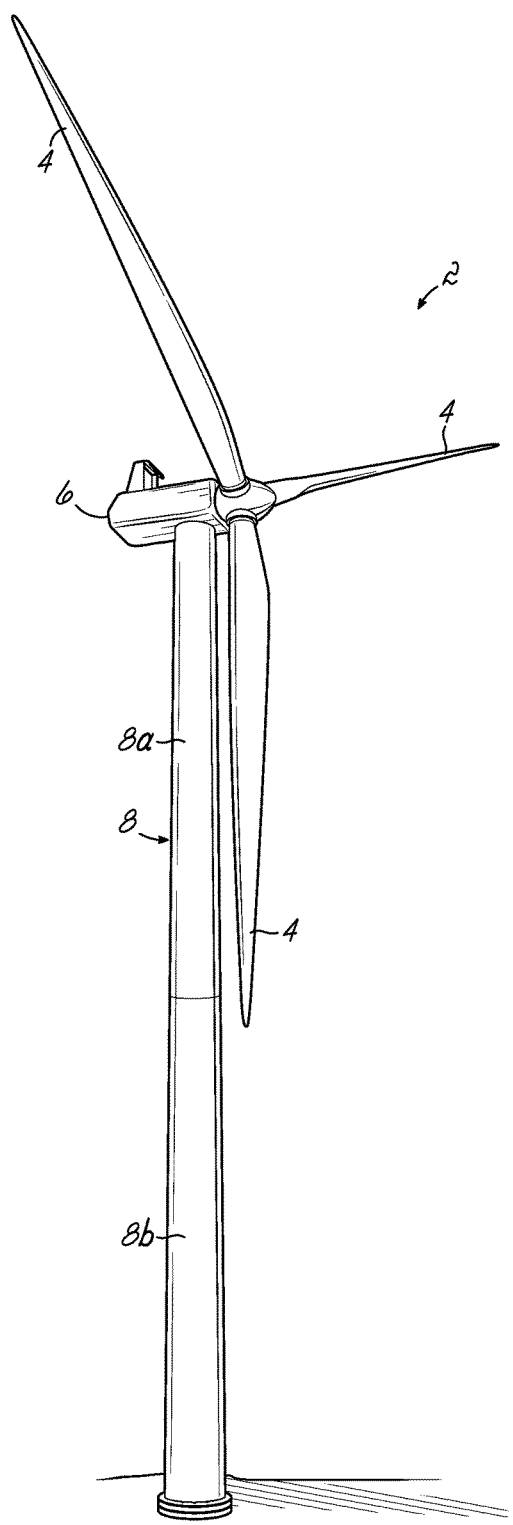
FIG. 1 is a perspective view of an example of a wind turbine.

FIG. 1 shows one example of a wind turbine 2 having a rotor 4 mounted to a nacelle 6, which is supported on a tower 8. The rotor 4 serves as the prime mover for an electromechanical system. Wind causes the rotor 4 to rotate, and this rotational energy is delivered to a power transmission system housed within the nacelle 6. The power transmission system converts the rotational energy into electrical power.

The tower 8 shown in FIG. 1 is a tubular steel tower comprised of multiple tower sections 8a, 8b. The tower sections 8a, 8b are cylindrical or slightly tapered (i.e., conical) and stacked on top of each other. Again, however, this is merely an example. The description below focuses damping tower oscillations and may apply to any wind turbine tower that is a tall, slender structure susceptible to oscillations. For example, the description may apply to steel towers having segmented tower sections, concrete towers, composite towers, hybrid towers (e.g., steel and concrete), wooden towers, etc.

Figure 2:
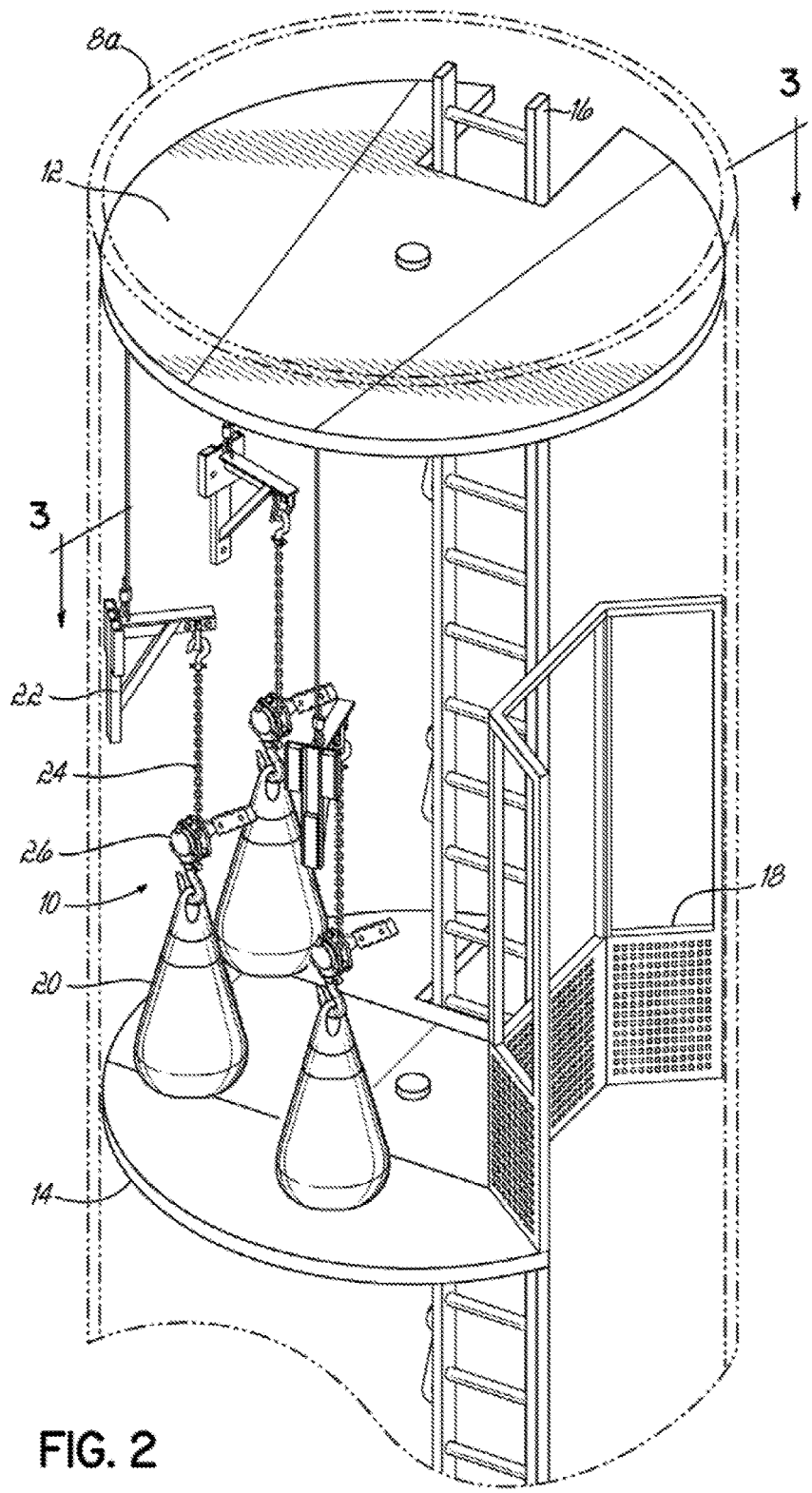
FIG. 2 is a perspective view of a damping system installed in a tower of the wind turbine.

With this in mind, and now referring to FIG. 2, one embodiment of a damping system 10 for the tower 8 is shown. The damping system 10 in this embodiment is installed in one of the tower sections (e.g., the uppermost tower section 8a). The installation process of the damping system 10 and its context within the overall installation of the wind turbine 2 will be described in further detail below. As shown in FIG. 2, the tower section 8a includes various tower components, such as an upper platform 12, lower platform 14, and ladder 16 providing access to the upper and lower platforms 14, 16. The lower platform 14 is shaped to accommodate an elevator lift (not shown) and includes safety fencing 18 around the area for the elevator lift.

Figure 3:
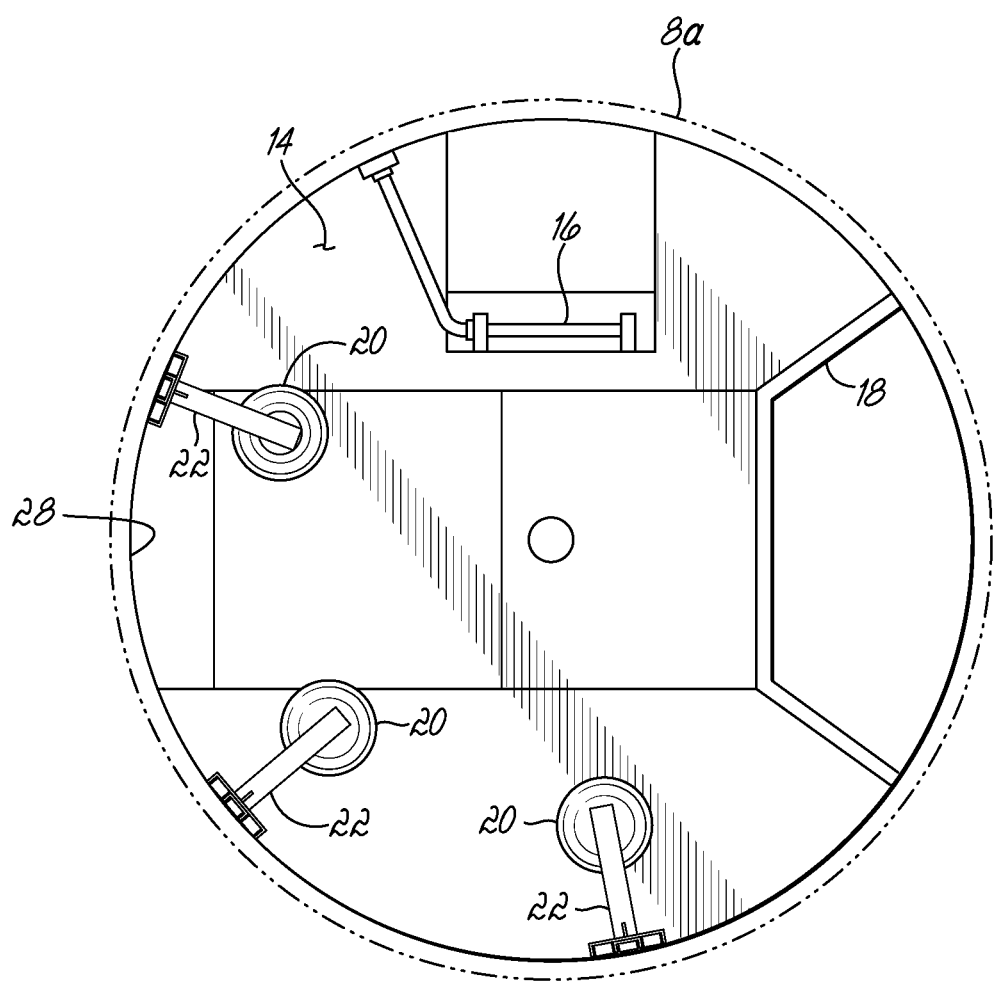
FIG. 3 is a top elevation view the damping system of FIG. 2.

The damping system 10 includes several sandbags 20 that are each suspended from a bracket 22 by a chain 24. More specifically, the sandbags 20 are each suspended from the hook of a ratchet wrench 26 (also referred to as a "ratchet chain hoist") positioned on the associated chain 24. The brackets 22 and sandbags 20 are distributed circumferentially about the tower section 8a in relation to a tower wall 28, as shown in FIG. 3. Although three sandbags 20 are shown, any number of sandbags or even a single sandbag may be used in alternative embodiments. There may also be multiple sandbags suspended from the same bracket in alternative embodiments.

Figure 4:
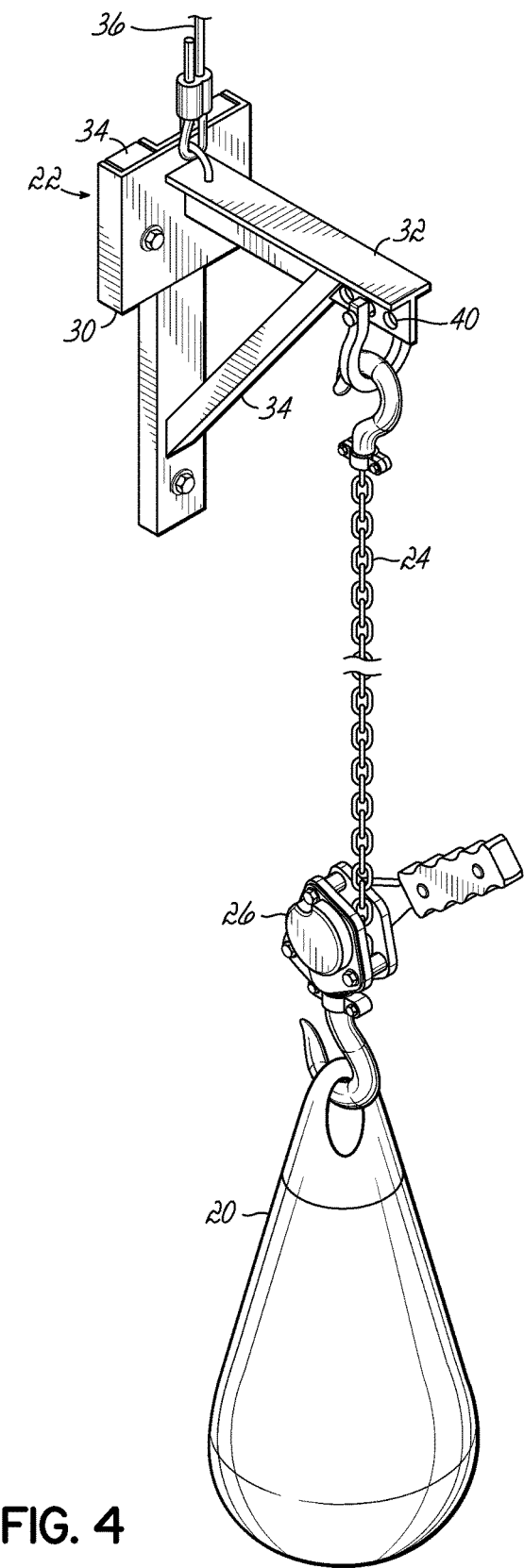
FIG. 4 is a perspective view showing a portion of the damping system of FIG. 2 in further detail.

One of the brackets 22 and one of the sandbags 20 are shown in greater detail in FIG. 4. The bracket 22 in this embodiment comprises a vertical support 30, horizontal support 32, and cross beam 34. The vertical support 30 may be mounted to a tower wall 28 using known techniques. For example, the bracket 22 may be bolted or otherwise secured to magnets 34, which in turn are magnetically attached to the tower wall 28. Examples such magnets and techniques are described in WO 2003/067083 and WO 2004/099609. Other known techniques include fastening, welding, adhesion, etc. A safety cable 36 or the like may connect the bracket 22 to another, permanently-installed tower component, such as the upper platform 12, thereby providing a back-up means of support in the event the bracket 22 slips along or disengages from the tower wall 28 due to ineffective mounting.

The horizontal support 32 of the bracket 22 includes different attachment points 40 for the chain 24. This allows the sandbag 20 to be connected to the bracket 22 at different lateral distances from the tower wall 28. The vertical distance by which the sandbag 20 is suspended from the bracket 22 may be adjusted using the ratchet wrench 26. The lateral distance, vertical distance, and mass of each sandbag 20 are such that the sandbags 20 are configured to hit said tower wall 28, 56 during oscillations in said wind turbine tower, in order to damp said oscillations. It has been found that the most efficient damping is found when at least a small lateral distance is present between the sandbag and the wall, such that a small number of oscillations of the sandbag will occur prior to it hitting the wall. This small number may typically be below 10, such as about 5. Further, in advantageous embodiments, the sandbags are configured to act as pendulums that counteract a fundamental mode of vibration of the tower 8. Hereby, upon oscillation of the tower due to vortex shedding, the sandbags will start oscillating with a frequency corresponding to a fundamental mode of vibration of the tower for a few oscillations before taking out part of the kinetic energy in that oscillation by hitting the tower, thereby transforming the kinetic energy into heat energy through a plastic deformation of the sandbag.

The damping system 10 has the advantage of being easy to install and remove, which provides a great amount of flexibility in terms of its use. For example, the damping system 10 may be installed as a permanent fixture intended to remain in the tower 8 after the wind turbine 2 has been fully erected, or as a retrofit or temporary solution for addressing tower oscillations as they arise. The latter situation is particularly advantageous during the installation process of a wind turbine because of the challenges mentioned in the background section above.

Accordingly, one method of installing the wind turbine 2 may involve using the damping system 10 during one or more stages of the installation. Such a method first comprises partially or completely erecting the tower 8. Assuming the latter situation with the tower 8 being that shown in FIGS. 1 and 2, the damping system 10 may be installed in the uppermost tower section 8a before or after the tower section 8a is erected. For example, the brackets 22 may be mounted to the tower wall 28 and the sandbags 20 connected to the brackets 22 prior to transporting the tower section 8a to the site of installation. These steps may alternatively occur after mounting the tower section 8a to the other previously-installed tower section 8b (or a foundation in embodiments where the tower 8 only comprises one tower section). Either way, the sandbags 20 are eventually suspended from the brackets 22 by an initial distance. This distance is adjusted by operating the ratchet wrench 26 until a desired vertical distance is attained.

The desired vertical distance depends on the height of the tower 8, as does the desired lateral distance from the tower wall 28 (determined by the attachment point 40 of the chain 24 to the bracket 22). Again, the lateral distance, vertical distance, and mass of each sandbag 20 are selected such that the sandbags 20 are configured to hit said tower wall 28, 56 during oscillations in said wind turbine tower, in order to damp said oscillations. Further, in advantageous embodiments, the sandbags are configured to act as pendulums that counteract a fundamental mode of vibration of the tower 8. The method is particularly advantageous if the fundamental mode of vibration is the first natural frequency of bending vibration of the tower 8. This frequency is the most susceptible to oscillations caused by vortex shedding because of the lower wind speeds at which vortex shedding can be in resonance with the frequency. Thus, tuning the damping system 10 to the first natural frequency of bending vibration maximizes its effectiveness at damping oscillations caused by vortex shedding. The tower 8 may remain standing for an extended period of time prior to installing the nacelle 6 or its components, whose significant weight changes the dynamics of the overall structure and makes vortex shedding less of a concern. The logistics of installing a wind farm with several wind turbines may be optimized to make the most efficient use of resources and equipment (e.g., cranes).

Eventually the damping system 10 is removed from the tower 8. This may be done after positioning one or more nacelle components (or even an entire nacelle with all nacelle components) on the tower 8. Alternatively, it may be done shortly before positioning the one or more nacelle components such that the tower 8 is only susceptible to oscillations caused by vortex shedding for a short period of time. One way in which the damping system 10 may be removed is by positioning the sandbags 20 onto the lower platform 14 (e.g., by using the ratchet wrenches 26). Each sandbag 20 is then moved from the lower platform 14 onto the elevator lift, transported toward the bottom of the tower 8 using the elevator lift, and eventually removed through a door near the bottom of the tower 8. It may be necessary to repeat these steps one or more times depending on the number of sandbags used and the capacity of the elevator lift.

The damping system 10 may also be used earlier in the installation process, for example, when less than all of the tower sections have been erected. In that situation the damping system 10 is installed in the last tower section erected. The lateral distance and/or vertical distance of the sandbags 20 will be different from when the damping system 10 is used in the uppermost section of a completely-erected tower so that the damping system 10 is tuned to a natural frequency of the partially-erected tower. The different attachment points 40 on the brackets 22 and the ratchet wrenches 26 facilitate the ability to set these distances according to the dynamics of the structure.

As can be appreciated, the partially-erected tower may remain standing for an extended period of time without concerns that vortex shedding will lead to significant oscillations. When the next tower section is going to be installed to continue or complete the erection of the tower, the damping system 10 may first be removed by passing the sandbags 20 through an open top end of the tower section in which they were installed. It is also possible to remove the damping system 10 in the manner described above using the elevator lift. Alternatively, if the damping system 10 is to be used in the next tower section, it may remain in the tower until the next tower section is installed and then moved accordingly. In other words, the damping system 10 may be removed from one tower section and installed in the next.

Figure 5:
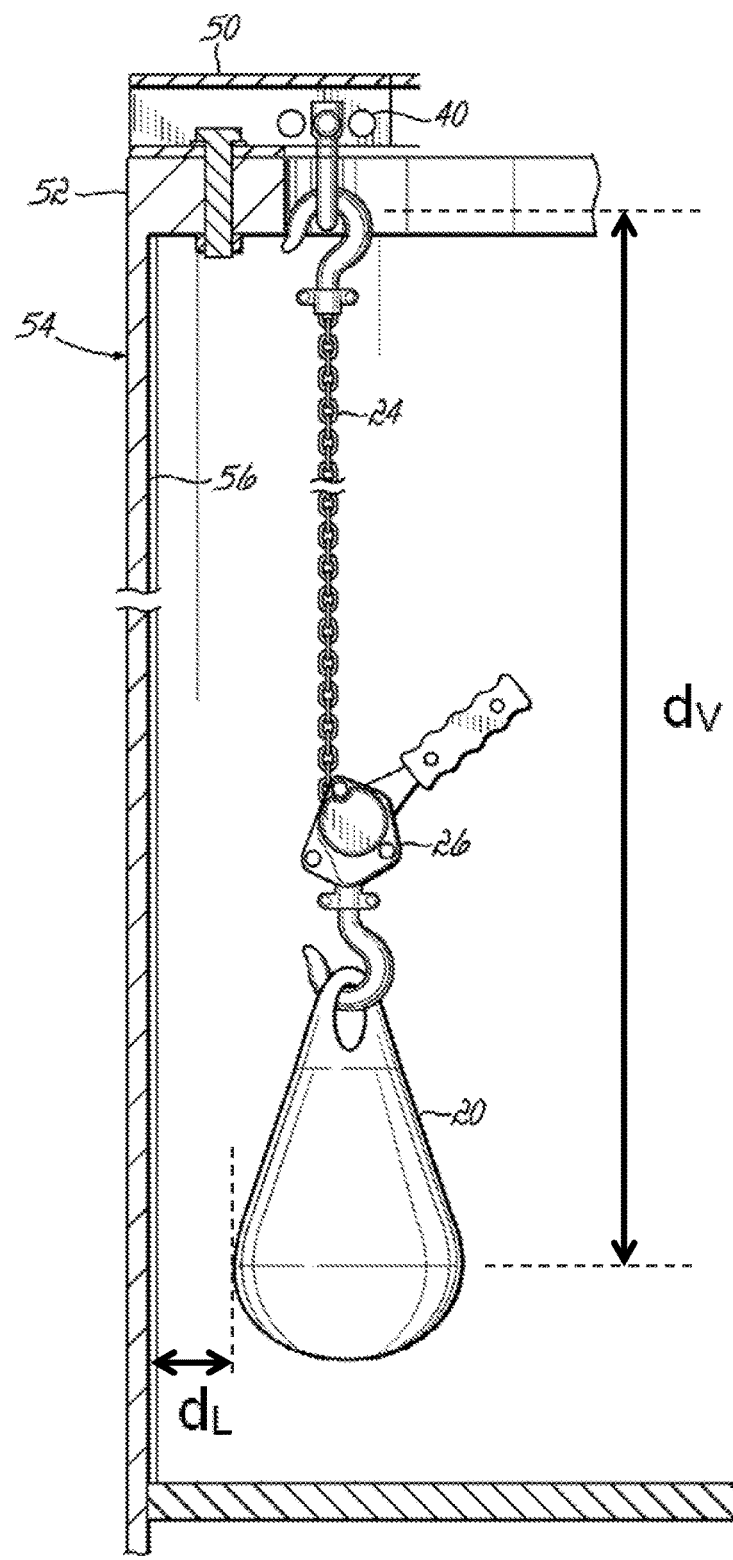
FIG. 5 is a cross-sectional view of a portion of tower with a damping system installed according to an alternative embodiment.

Various alternatives to the above-described embodiments are shown in FIGS. 5-8, where the same reference numbers are used to refer to corresponding structures. As will be appreciated, the brackets 22 in the above-described embodiments are merely representative tower components to which the sandbags 20 are connected via the ratchet wrenches 26 and chains 24. Other tower components may support the sandbags instead. For example, FIG. 5 illustrates a sandbag 20 being connected to and suspended from a different type of bracket. The bracket shown is a beam 50 secured to a top flange 52 of a tower section 54 and extending inwardly away from a tower wall 56. Further, in FIG. 5 is illustrated how the lateral ($d_L$) and vertical ($d_V$) distances as mentioned herein are understood. $d_L$ is the distance between the tower wall and the part of the bag closest to the tower wall, whereas $d_V$ is the distance between the point of contact for suspending the bag to a tower component fixed relative to the tower wall and the center of gravity of the bag.

Figure 6:
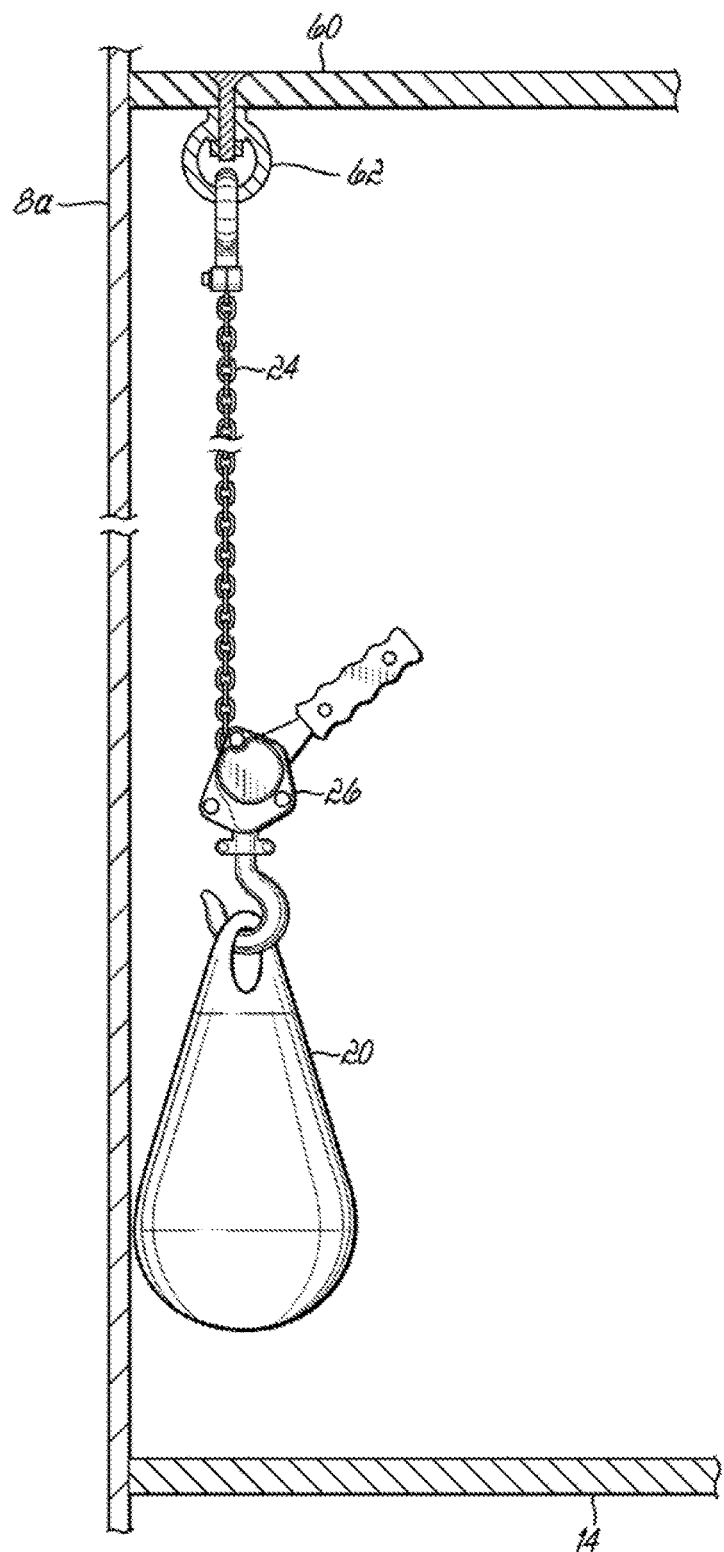
FIG. 6 is a cross-sectional view of a portion of tower with a damping system installed according to another alternative embodiment.

FIG. 6 illustrates a sandbag 20 being connected to and suspended from a platform 60 (e.g., the upper platform 12 in FIG. 2). The connection occurs via the ratchet wrench 26 and chain 24, which is hooked onto or otherwise secured to an eye nut 62 that has been bolted to the platform 60. However, skilled persons will appreciate other ways of connecting and suspending the sandbags 20. Further, FIG. 6 illustrates how a sandbag can be mounted such that it abuts the wall when hanging freely without any oscillations of the tower. This solution can be used to dampen tower oscillations as well; however as the sandbag will only carry out one half oscillation each time before hitting the wall, the damping of the tower oscillations is believed to be better with a small lateral distance between the sandbag and the tower wall as described above.

Figure 7:
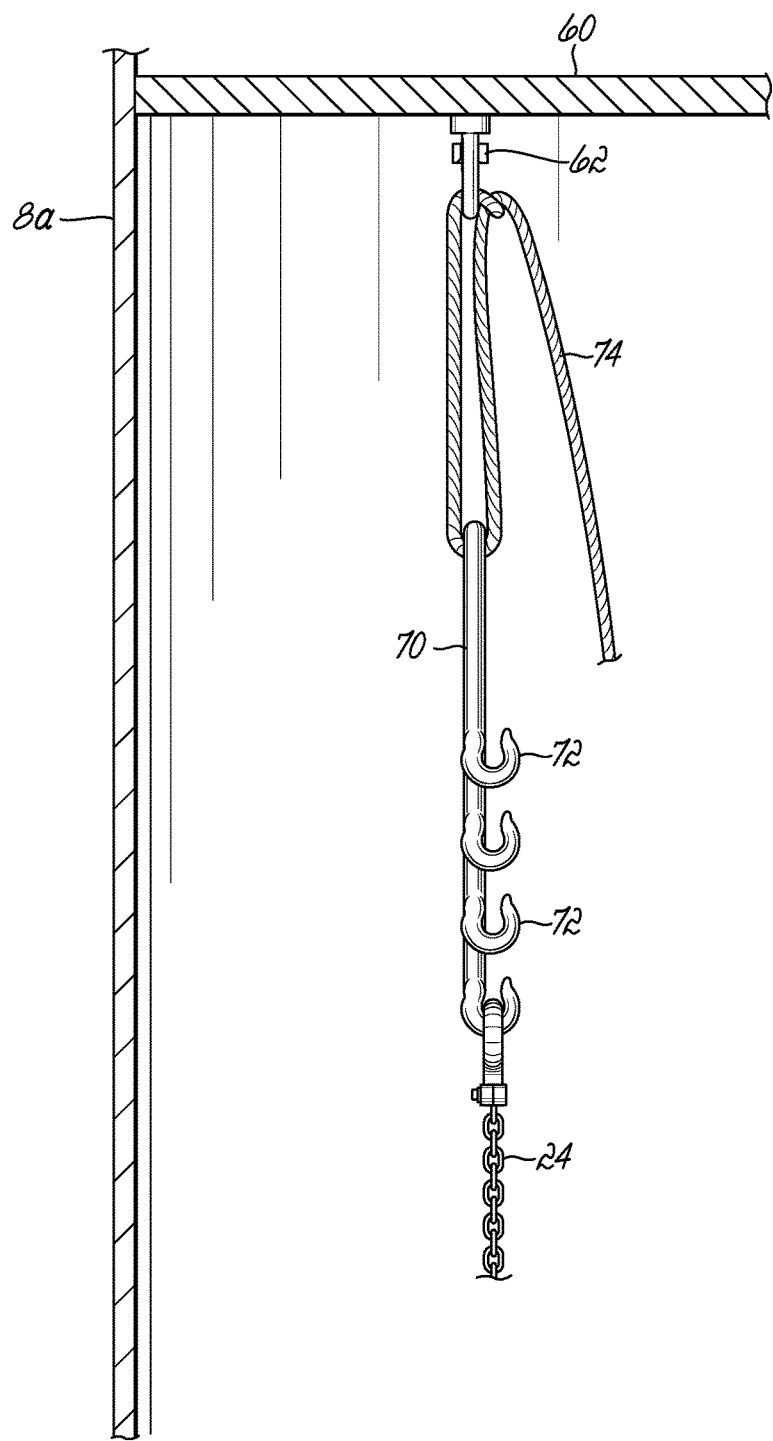
FIG. 7 is a cross-sectional view of a portion of tower with a damping system installed according to yet another alternative embodiment.

FIG. 7 illustrates a variation of the embodiment shown in FIG. 6. Rather than securing the chain 24 directly to an eye nut 62, the arrangement includes a frame 70 from which the chain 24 extends. The chain 24 may be engaged with one of several hooks 72 provided on the frame 70, which in turn is suspended from the eye nut 62 by a rope or cable 74. The rope 74 may be used like a sling and tied off to another tower component (not shown) after positioning the frame 70 at a desired height within the tower 8. With the hooks 72 positioned at different vertical distances, the frame 70 offers the ability to suspend the sandbags at different vertical distances from the platform 60 without the need for a ratchet wrench or the like. However, ratchet wrenches may still be used if desired.

Figure 8:
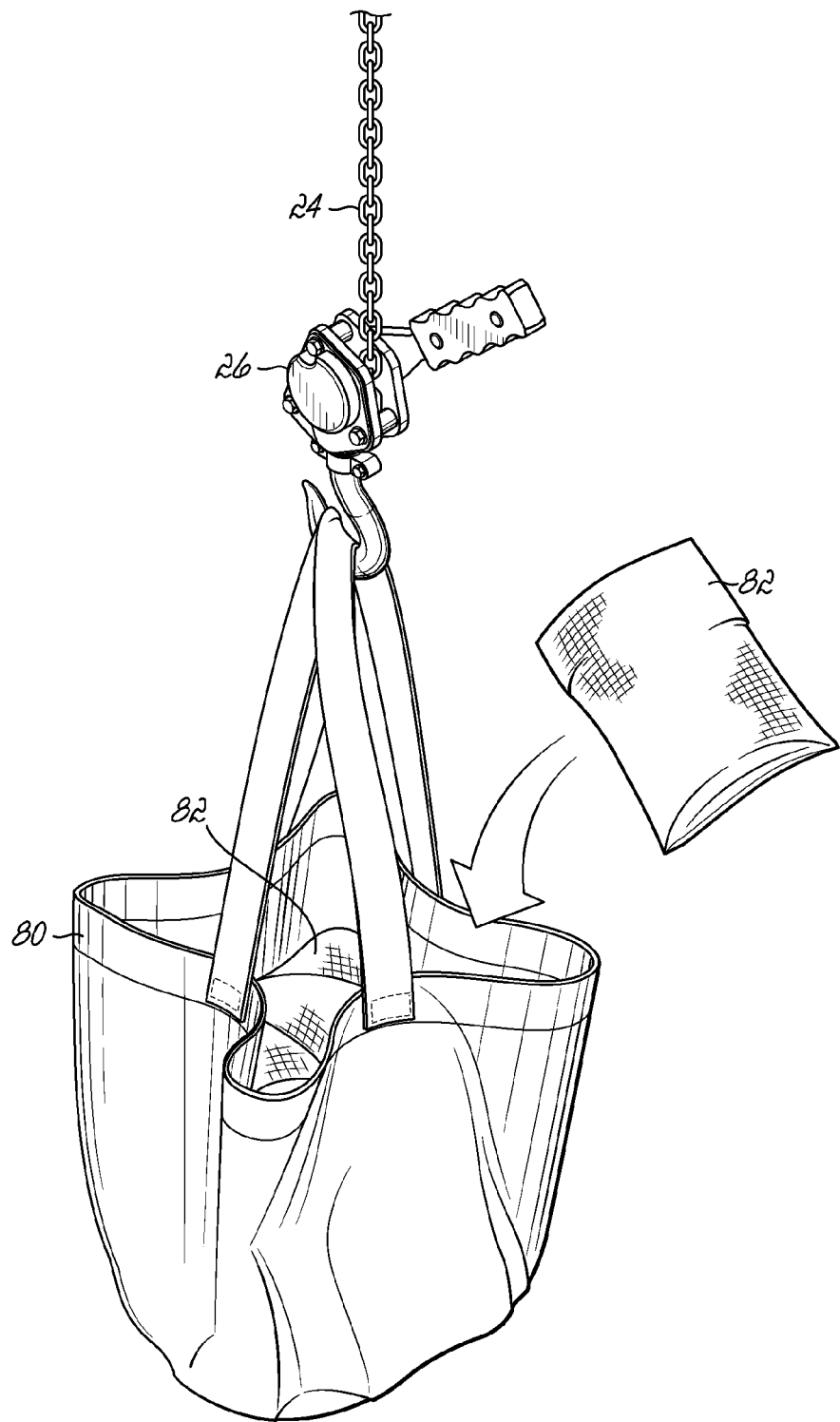
FIG. 8 is a perspective view of a portion of a damping system according to an alternative embodiment.

Finally, FIG. 8 illustrates an alternative to the sandbags shown in other figures. A conventional bag 80, such as a tool bag, may be filled with more or less anything with a desired combined mass, such as a number of smaller sandbags 82 or other bags of liquid or material. The smaller bags 82 have the advantage of being easier to handle and transport compared to the sandbags 20 shown in FIGS. 2-6. The bag 80 is filled with a sufficient number of the smaller bags 82 to provide the desired mass.

The embodiments described above are merely examples of the invention defined by the claims that appear below. Those skilled in the art will appreciate additional examples, modifications, and advantages based on the description. For example, although sandbags are shown and described above, any bag of liquid or material may be used according to the invention. The term "bag" is meant in a broad sense to include any receptacle, container, or other structure that holds the liquid or material. And although the sandbags are shown and described as being connected to the tower component(s) via ratchet wrenches and chains, it is also possible to use cables, ropes, or other devices. The term "tower wall" herein is meant in a broad sense to also include tower parts in connection with said tower wall, suitable for the purpose. Thus, the details of any particular embodiment should not be seen to necessarily limit the scope of the claims below. In addition to appreciating other modifications and variations, skilled persons will understand how features of the various embodiments may be combined in different ways.

The invention claimed is:

1. A method of damping oscillations in a wind turbine tower, comprising:
    suspending a bag of material or liquid from a tower component such that the bag is configured to hit a tower wall of said wind turbine tower during oscillations in said wind turbine tower, in order to damp said oscillations in said wind turbine tower.

2. The method according to claim 1, comprising:
    connecting the bag of material or liquid to a tower component at a first lateral distance away from the tower wall;
    suspending the bag from the tower component by a first vertical distance, wherein a height of the tower component is known such that the first vertical distance corresponds to a particular height within the tower, and further wherein the first lateral distance, first vertical distance, and mass of the bag are such that the bag is configured to hit said tower wall during oscillations in said wind turbine tower, in order to damp said oscillations in said wind turbine tower.

3. The method according to claim 2, wherein a ratio between said first vertical distance and said first lateral distance is between 5 and 20.

4. The method according to claim 3, wherein the ratio between said first vertical distance and said first lateral distance is between 8 and 15.

5. The method according to claim 3, wherein the ratio between said first vertical distance and said first lateral distance is between 10 and 12.

6. The method according to claim 2, wherein the first lateral distance, first vertical distance, and mass of the bag are such that the bag during oscillation will act as a pendulum counteracting a fundamental mode of vibration of the tower prior to hitting said wind turbine tower.

7. The method according to claim 2, wherein the bag is connected to and suspended from the tower component with a chain, cable, or rope, and wherein suspending the bag comprises:
    suspending the bag an initial distance from the tower component; and
    adjusting the distance by which the bag is suspended from the tower component until the first vertical distance is attained.

8. The method according to claim 2, wherein the bag is connected to and suspended from the tower component with a chain and via a ratchet wrench positioned on the chain, and wherein suspending the bag comprises:
suspending the bag an initial distance from the tower component; and
adjusting the distance by which the bag is suspended from the tower component by operating the ratchet wrench to move the bag along the chain.

9. The method according to claim 1, wherein a mass of said bag is between 20 kg and 300 kg.

10. The method according to claim 1, whereby said damping of oscillations is at least partly obtained by converting kinetic energy into heat energy through plastic deformation of said bag.

11. The method according to claim 1, further comprising:
mounting a bracket to the tower, the bracket extending away from the tower wall and serving as the tower component to which the bag is connected.

12. The method according to claim 11, wherein mounting the bracket to the tower comprises securing the bracket to the tower wall without welding.

13. The method according to claim 11, wherein mounting the bracket to the tower comprises securing the bracket to a flange of the tower.

14. The method according to claim 1, wherein the bag is connected to and suspended from a platform in the tower.

15. The method according to claim 1, further comprising:
providing a plurality of bags of material or liquid; and
connecting and suspending the bags to a common tower component or respective tower components, wherein at least some of the bags are distributed circumferentially in relation to the tower wall.

16. The method according to claim 1, further comprising:
positioning the bag onto a platform in the tower;
moving the bag from the platform onto an elevator lift;
transporting the bag toward the bottom of the tower using the elevator lift; and
removing the bag through a door in the tower.

17. The method according to claim 1, further comprising:
filling the bag with a plurality of smaller bags, wherein the smaller bags effectively provide an overall mass of the bag.

18. A system for damping oscillations experienced by a wind turbine tower, comprising:
one or more bags of material or liquid;
one or more tower components configured to be secured to the tower; and
one or more chains, cables, or ropes configured to suspend the one or more bags from the one or more tower components,
wherein said system is configured such that upon installation in the wind turbine tower, the bag is configured to hit a tower wall of said wind turbine tower during oscillations in said wind turbine tower, in order to damp said oscillations in said wind turbine tower.

19. The system according to claim 18,
wherein said bag is connected to said one or more tower components at a first lateral distance away from a tower wall; and
wherein said bag is suspended from the tower component by a first vertical distance, wherein a height of the tower component is known such that the first vertical distance corresponds to a particular height within the tower, and further wherein the first lateral distance, first vertical distance, and mass of the bag are such that the bag is configured to hit said tower wall during oscillations in said wind turbine tower, in order to damp said oscillations in said wind turbine tower.

20. The system according to claim 19, wherein a ratio between said first vertical distance and said first lateral distance is between 5 and 20.

21. The system according to claim 19, wherein the first lateral distance, first vertical distance, and mass of the bag are such that the bag during oscillation will act as a pendulum counteracting a fundamental mode of vibration of the tower prior to hitting said wind turbine tower.

22. The system according to claim 18, wherein a mass of said bag is between 20 kg and 300 kg.

23. The system according to claim 18, wherein the one or more tower components have multiple attachment points for the chains, cables, or ropes so that the bags can be positioned at different lateral distances from a wall of the wind turbine tower.

24. The system according to claim 18, wherein each bag comprises at least one large bag filled with a number of smaller bags containing the material or liquid.

25. A wind turbine comprising:
a tower;
a nacelle supported by the tower;
a rotor mounted to the nacelle; and
a damping system for damping oscillations experienced by a wind turbine tower, the damping system comprising:
one or more bags of material or liquid;
one or more tower components configured to be secured to the tower; and
one or more chains, cables, or ropes configured to suspend the one or more bags from the one or more tower components,
wherein said damping system is configured such that upon installation in a wind turbine tower, the bag is configured to hit a tower wall of said wind turbine tower during oscillations in said wind turbine tower, in order to damp said oscillations in said wind turbine tower.

26. A method of installing a wind turbine, comprising:
providing a tower of the wind turbine having at least one tower wall, one or more tower components configured to be secured to the tower, and a damping system, the damping system comprising one or more bags of material or liquid and one or more chains, cables, or ropes;
erecting the tower of the wind turbine;
installing the damping system in the tower, wherein the bag of the damping system hits a tower wall of the wind turbine tower during oscillations in the tower, in order to damp the oscillations in the wind turbine tower, wherein the one or more chains, cables, or ropes suspend the one or more bags from the one or more tower components;
positioning one or more nacelle components on the tower thereby making the tower less susceptible to oscillations caused by vortex shedding; and
removing the damping system from the tower prior to start-up of the wind turbine.

27. The method according to claim 26, wherein the tower comprises multiple tower sections, and further wherein erecting the tower comprises erecting less than all of the tower sections, the damping system being used to dampen oscillations of the partially-erected tower, the method further comprising:
erecting another tower section to continue or complete the erection of the tower.

28. The method according to claim 27, wherein the installing and damping steps are repeated after erecting the another tower section, the bag being connected to the tower component at a second lateral distance and suspended from a tower component by a second vertical distance when the installing and damping steps are repeated.

29. The method according to claim 26, wherein installing the damping system further comprises:
   installing the tower component in a tower section before the tower section is erected as part of the tower.

30. The method according to claim 26, wherein installing the damping system comprises passing the bag through an open top end of the tower or through a door of the tower after the tower is erected.

* * * * *